(12) United States Patent
Ng et al.

(10) Patent No.: US 10,389,543 B2
(45) Date of Patent: Aug. 20, 2019

(54) STARTING MEETING USING NATURAL USER INPUT

(71) Applicant: Microsoft Technology Licensing, LLC, Redmond, WA (US)

(72) Inventors: Isaiah Ng, Seattle, WA (US); Reza Ferrydiansyah, Redmond, WA (US); Christopher M. Becker, Bellevue, WA (US); Chad Roberts, Snohomish, WA (US); Roberto Sonnino, Seattle, WA (US); Lisa Stifelman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 15/195,703

(22) Filed: Jun. 28, 2016

(65) Prior Publication Data
US 2017/0195128 A1 Jul. 6, 2017

Related U.S. Application Data

(60) Provisional application No. 62/274,015, filed on Dec. 31, 2015.

(51) Int. Cl.
*G06F 3/0484* (2013.01)
*H04L 12/18* (2006.01)
(Continued)

(52) U.S. Cl.
CPC ........ *H04L 12/1822* (2013.01); *G06F 3/0484* (2013.01); *G06Q 10/1095* (2013.01);
(Continued)

(58) Field of Classification Search
CPC .................................................... G06F 3/0484
(Continued)

(56) References Cited

U.S. PATENT DOCUMENTS 5,428,678 A * 6/1995 Fitzpatrick ............ H04M 1/006
  379/201.02
5,619,555 A * 4/1997 Fenton .................. H04M 3/563
  379/196
(Continued)

FOREIGN PATENT DOCUMENTS

CN 103605340 A 2/2014

OTHER PUBLICATIONS

Slipstick.com, "How to View the Organizers of Your Appointments", available at <https://www.slipstick.com/outlook/calendar/how-to-view-the-organizers-of-your-appointments/>, archived on Jan. 20, 2012 at wayback machine <http://web.archived.org>, 2 pages.*
(Continued)

*Primary Examiner* — Daniel Rodriguez
(74) *Attorney, Agent, or Firm* — Alleman Hall Creasman & Tuttle LLP

(57) ABSTRACT

A computing device is provided, which may include an input device configured to receive natural user input, and an application program executed by a processor of the computing device, the application program configured to: retrieve an electronic calendar including calendar data for one or more meeting events, each meeting event including a meeting time and meeting data, receive a generic meeting invocation request via a natural user input detected by the input device, based on at least receiving the generic meeting invocation request at a point in time, search the electronic calendar for a meeting event having a meeting time that is within a threshold time period of the point in time that the natural user input was received, and start the meeting event including processing the meeting data for the meeting event.

18 Claims, 6 Drawing Sheets

(51) Int. Cl.
*G06Q 10/10* (2012.01)
*H04L 29/06* (2006.01)
*H04M 3/56* (2006.01)

(52) U.S. Cl.
CPC ........ *H04L 65/1069* (2013.01); *H04L 65/403* (2013.01); *H04M 3/565* (2013.01)

(58) Field of Classification Search
USPC .......................................................... 715/753
See application file for complete search history.

(56) References Cited

U.S. PATENT DOCUMENTS

| | | | |
|---|---|---|---|
| 5,842,009 A * | 11/1998 | Borovoy | G06Q 10/109 |
| 6,798,753 B1 | 9/2004 | Doganata et al. | |
| 7,317,791 B2 | 1/2008 | Carlson | |
| 7,340,484 B2 | 3/2008 | Krishna et al. | |
| 7,849,079 B2 | 12/2010 | Chandrasekar et al. | |
| 8,036,926 B2 | 10/2011 | McBrearty et al. | |
| 8,111,282 B2 | 2/2012 | Cutler et al. | |
| 8,165,886 B1 * | 4/2012 | Gagnon | G10L 15/19 |
| | | | 704/275 |
| 8,223,088 B1 * | 7/2012 | Gomez | G06F 3/03547 |
| | | | 345/7 |
| 8,375,034 B2 | 2/2013 | Norton et al. | |
| 8,694,165 B2 | 4/2014 | Smith et al. | |
| 8,767,932 B2 | 7/2014 | Shah et al. | |
| 8,782,566 B2 | 7/2014 | Sarkar et al. | |
| 8,965,269 B2 | 2/2015 | McClaughry et al. | |
| 9,093,071 B2 | 7/2015 | Crawley et al. | |
| 9,325,828 B1 * | 4/2016 | Oh | H04M 1/72569 |
| 9,711,148 B1 * | 7/2017 | Sharifi | G10L 17/02 |
| 9,805,723 B1 * | 10/2017 | Roy | G10L 15/19 |
| 2002/0040297 A1 * | 4/2002 | Tsiao | G06F 3/16 |
| | | | 704/257 |
| 2002/0049589 A1 * | 4/2002 | Poirier | G10L 15/34 |
| | | | 704/235 |
| 2003/0046072 A1 * | 3/2003 | Ramaswamy | G06F 17/2881 |
| | | | 704/240 |
| 2004/0054539 A1 * | 3/2004 | Simpson | G10L 15/30 |
| | | | 704/270.1 |
| 2006/0095556 A1 * | 5/2006 | Arnold | H04M 1/72522 |
| | | | 709/223 |
| 2006/0129444 A1 * | 6/2006 | Baeza | G06Q 10/109 |
| | | | 705/7.19 |
| 2006/0206522 A1 * | 9/2006 | Austin | G06Q 10/109 |
| 2007/0198314 A1 * | 8/2007 | Andrew | G06Q 10/06316 |
| | | | 705/7.19 |
| 2007/0242809 A1 * | 10/2007 | Mousseau | H04M 7/0036 |
| | | | 379/88.18 |
| 2007/0300163 A1 * | 12/2007 | Alford | G06Q 10/109 |
| | | | 715/751 |
| 2008/0219426 A1 | 9/2008 | Lai | |
| 2009/0119246 A1 | 5/2009 | Kansal | |
| 2010/0070640 A1 * | 3/2010 | Allen, Jr. | G06Q 10/10 |
| | | | 709/229 |
| 2010/0088144 A1 * | 4/2010 | Collet | G06Q 10/06311 |
| | | | 705/7.13 |
| 2010/0114944 A1 * | 5/2010 | Adler | G10L 13/027 |
| | | | 707/770 |
| 2011/0271206 A1 | 11/2011 | Jones et al. | |
| 2012/0023556 A1 * | 1/2012 | Schultz | G06F 21/41 |
| | | | 726/4 |
| 2012/0216151 A1 * | 8/2012 | Sarkar | G06F 3/04883 |
| | | | 715/863 |
| 2012/0284637 A1 * | 11/2012 | Boyer | G06Q 10/109 |
| | | | 715/751 |
| 2012/0293605 A1 | 11/2012 | Seferian et al. | |
| 2013/0268260 A1 * | 10/2013 | Lundberg | G06F 17/28 |
| | | | 704/8 |
| 2013/0278631 A1 * | 10/2013 | Border | G02B 27/017 |
| | | | 345/633 |
| 2014/0006082 A1 * | 1/2014 | Harms | G06Q 10/1095 |
| | | | 705/7.19 |
| 2014/0081633 A1 * | 3/2014 | Badaskar | G10L 15/26 |
| | | | 704/235 |
| 2014/0330515 A1 | 11/2014 | El Dokor et al. | |
| 2014/0337080 A1 * | 11/2014 | Jackson | G06Q 10/1095 |
| | | | 705/7.19 |
| 2015/0006221 A1 | 1/2015 | Mermelstein | |
| 2015/0032484 A1 | 1/2015 | Mermelstein | |
| 2015/0067044 A1 | 3/2015 | Bakaev | |
| 2015/0085058 A1 | 3/2015 | Zhang et al. | |
| 2015/0121216 A1 * | 4/2015 | Brown | G06N 3/006 |
| | | | 715/707 |
| 2015/0169069 A1 | 6/2015 | Lo et al. | |
| 2015/0212684 A1 | 7/2015 | Sabia et al. | |
| 2016/0057124 A1 * | 2/2016 | Boyle | H04L 63/0861 |
| | | | 726/7 |
| 2016/0180296 A1 * | 6/2016 | McDonald | G06F 3/04842 |
| | | | 705/7.19 |
| 2016/0253631 A1 * | 9/2016 | Jones | G06Q 10/1095 |
| | | | 705/7.19 |
| 2016/0371340 A1 * | 12/2016 | Waltermann | G06F 16/9537 |
| 2017/0041356 A1 * | 2/2017 | Nelson | H04L 65/403 |
| 2017/0161268 A1 * | 6/2017 | Badaskar | G10L 15/26 |
| 2018/0109673 A1 * | 4/2018 | Sankaranarayanan | ....................... H04W 12/06 |

OTHER PUBLICATIONS

"Second Written Opinion Issued in PCT Application No. PCT/US2016/066746", dated Aug. 9, 2017, 7 Pages.

ISA European Patent Office, International Search Report and Written Opinion Issued in PCT Application No. PCT/US2016/066746, dated Mar. 29, 2017, WIPO, 11 Pages.

"Attend and Schedule Meetings from Your Phone (MeetingPlace Scheduling)", Published on: Sep. 20, 2015, Available at: http://www.cisco.com/c/dam/en/us/td/docs/voice_ip_comm/meetingplace/8_5/english/quickstart_guides/qgphonemp85.pdf.

Henry, Alan, "The Best Virtual Assistant for Android", Published on: Jul. 16, 2013, Available at: http://lifehacker.com/5883560/the-best-virtual-assistant-for-android.

"Audio Host Command", Published on: Aug. 21, 2014, Available at: http://www.meetingone.com/whitepapers/Audio_Host_Commands.pdf.

"Microsoft Surface Hub", Retrieved on: Apr. 4, 2016. Available at: https://www.microsoft.com/microsoft-surface-hub/en-us.

* cited by examiner

US 10,389,543 B2

STARTING MEETING USING NATURAL USER INPUT

CROSS REFERENCE TO RELATED APPLICATIONS

This application claims priority to U.S. Provisional Patent Application No. 62/274,015, filed Dec. 31, 2015, the entirety of which is hereby incorporated herein by reference.

BACKGROUND

Current meeting devices that are used in electronic aided meetings, such as videoconferencing for example, require significant set-up, preparation, and specific input from a user in order to appropriately instruct videoconferencing software programs executed thereon to initiate a specific meeting for the user. For example, current meeting devices require a user to manipulate elements on a screen of the device, or otherwise enter specific input into a graphical user interface of the videoconferencing program to select and start a specific meeting. However, this can be complicated, inconvenient, and potentially delay commencement of the meeting.

SUMMARY

A computing device to address at least the issues discussed above is provided. The computing device may include an input configured to receive natural user input, and an application program executed by a processor of the computing device, the application program configured to: retrieve an electronic calendar including calendar data for one or more meeting events, each meeting event including a meeting time and meeting data, receive a generic meeting invocation request via a natural user input detected by the input, based at least on receiving the generic meeting invocation request at a point in time, search the electronic calendar for a meeting event having a meeting time that is within a threshold time period of the point in time that the natural user input was received, and start the meeting event including processing the meeting data for the meeting event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
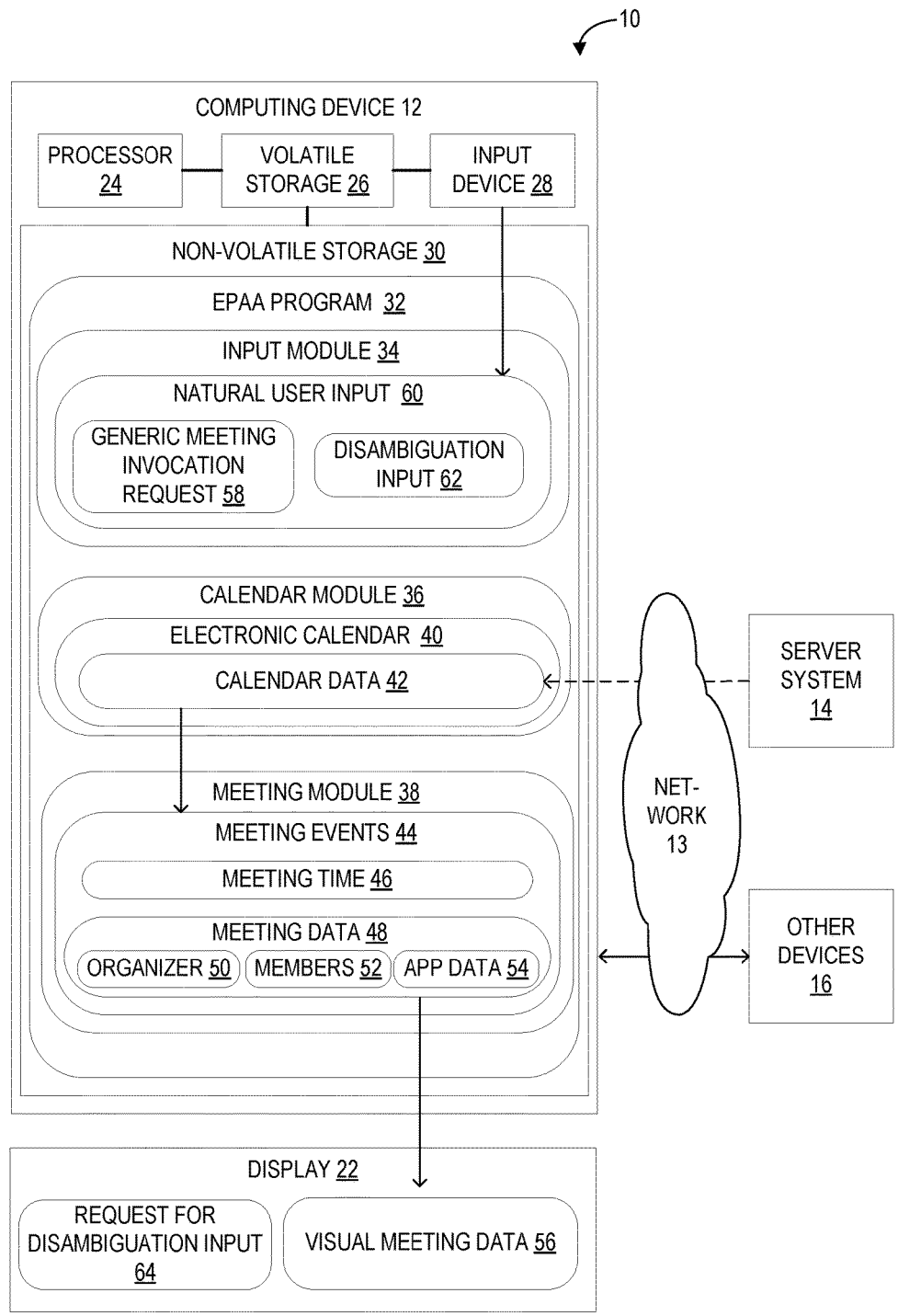
FIG. 1 shows an example computing system for use in conducting meetings, including a computing device configured as a communal meeting device according to an embodiment of the present description.
Figure 3:
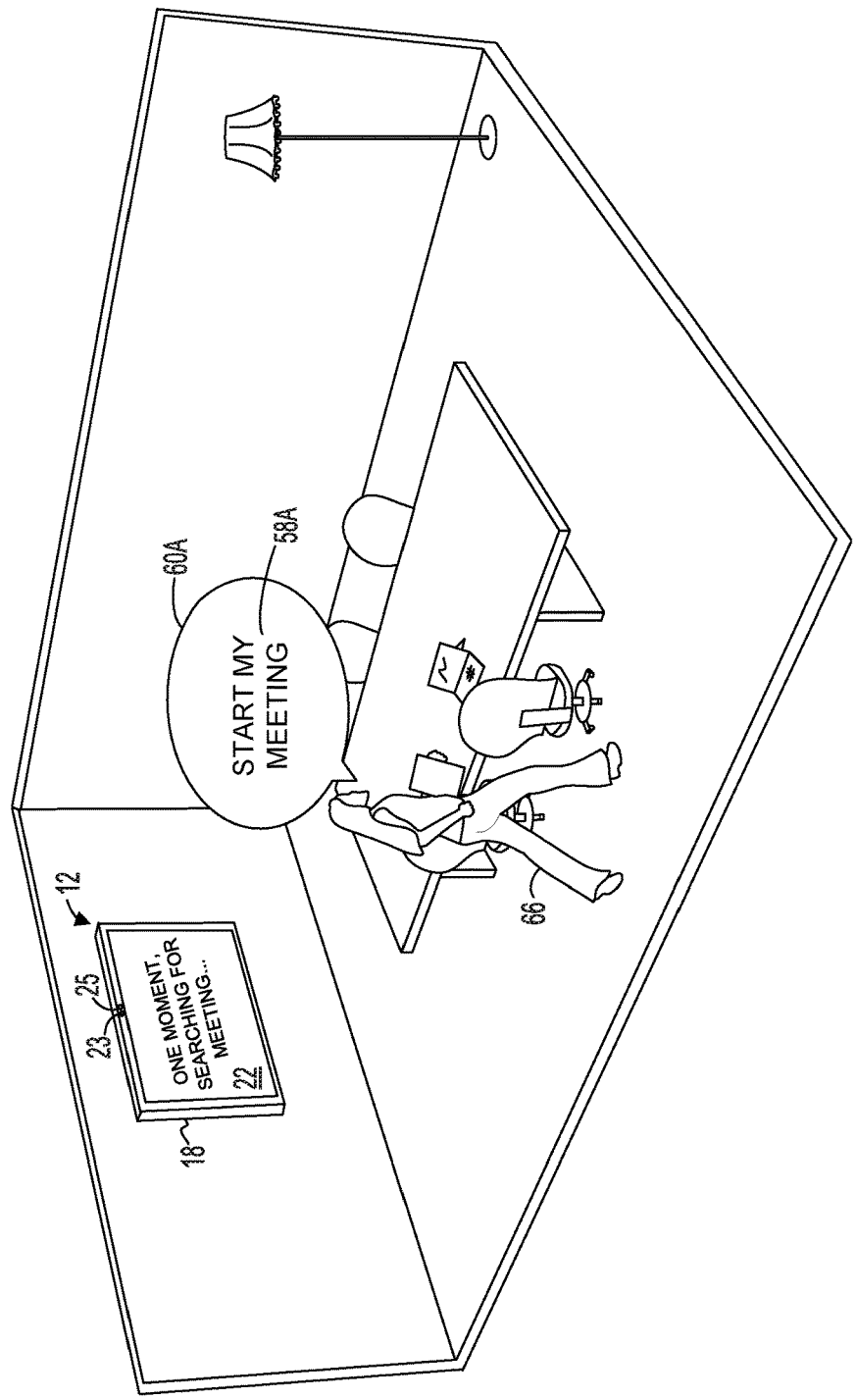
FIG. 3 shows an example generic meeting invocation request via a voice input from a user using the computing system of FIG. 1.

FIG. 1 illustrates an example computing system 10 according to one embodiment of the present disclosure. The computing system 10 includes computing device 12, which in one example may be configured as shown in FIG. 3 as a communal meeting device having a large format display and configured to be viewed by up to a plurality of participants in a communal gathering space such as a meeting room. Returning to FIG. 1, the computing device 12 may be configured to communicate via a communication network 13 with a server system 14 and other devices 16. The communication network may include, for example, a wide area network such as the Internet, Bluetooth networks, near-field communication networks, wired and wireless local area networks, etc. The other devices 16 may include various other computing devices, such as those of meeting participants, as well as peripherals such as printers, input devices such as styluses, and display devices such as projectors, and additional communal meeting devices in other locations, etc.

The computing device 12 includes a display 22, processor 24, a volatile storage 26, an input such as input device 28, and a non-volatile storage 30. The non-volatile storage 30 may be configured to store instructions for an application program such as an electronic personal assistant application program 32 executed by the processor 24 of the computing device 12. The input device 28 may include a touch sensor and a microphone, or any other suitable input device configured to receive natural user inputs. In this embodiment, the display 22 may take the form of a large format display that includes the touch sensor of the input device 28 in a touch sensing display configuration. Thus, as shown in FIG. 3, the computing device 12 may include a housing 18 and the display 22 may be a large format display that is mounted in the housing. Further, the touch sensor may be incorporated into the large format display to render it a touchscreen, and the microphone 23 may be mounted in the housing 18 along with a camera 25 for capturing an image of meeting participants. Regarding the diagonal dimension of the large format display, a variety of sizes are possible, such as larger than 30 inches in one example, larger than 40 inches in another example, and larger than 60 inches in another example.

As illustrated in FIG. 1, the electronic personal assistant application program 32 includes an input module 34, a calendar module 36, and a meeting module 38. The calendar module 36 of the electronic personal assistant application program 32 is configured to retrieve an electronic calendar 40 including calendar data 42 for one or more meeting events 44, each meeting event including a meeting time 46 and meeting data 48. The meeting time 46 may be a designated date and time that the corresponding meeting event is to take place. In one embodiment, the meeting data 48 for each of the one or more meeting events 44 includes a name of an organizer 50 of that meeting event, or another type of identification of an organizer that will initiate the meeting event, organize the meeting event, schedule the meeting event, or otherwise lead the meeting event. The meeting data 48 may also include data for members 52 of the meeting event, which, for example, may include names of people who will attend the meeting event, communication addresses of people who will attend the meeting event electronically or through telecommunication, shared notes and shared files for the people who will attend the meeting event, etc. The meeting data 48 may also include application data 54, which, for example, may include visual meeting data 56, such as a video feed or movie, etc., to be displayed on the display 22 or a projector of the other devices 16. The application data 54 may also include data for other applications on the computing device 12 to be started alongside the meeting event, for example, a visual presentation application (e.g., slide deck).

It will be appreciated that the calendar module 36 on the computing device 12 may be registered with a central calendar program executed by server system 14, and may be associated with a particular meeting location (i.e., meeting room). Thus, the electronic calendar 40 may be stored on the server systems 14, and may be retrieved by the calendar module 36 of the electronic personal assistant application program 32, and may indicate meetings to be held in the particular meeting location associated with the computing device 12. Once retrieved from the server system 14, the calendar data 40 may be stored in and then retrieved from local non-volatile storage 30. Thus, the non-volatile storage 30 of computing device 12 may be additionally configured to store the electronic calendar 40 including calendar data 42 for one or more meeting events 44. In another embodiment, the calendar data 42 may be retrieved from other devices 16.

Alternatively or additionally, the computing device 12 may be configured to store and manage the electronic calendar 40 without communicating with a server system 14. For example, the electronic calendar 40 may be stored on non-volatile storage 30 and the electronic personal assistant application program 32 may be configured to provide methods for users to manually create and add meeting events 44 and the corresponding meeting data 48. In one example, users may manually create meeting events 44 through inputs to input device 28 of computing device 12. In another example, the computing device 12 may communicate with the other device 16, such as a user's personal computing device, over the network 13 to create and add meeting events 44. Thus, in this example, the computing device 12 may identify a nearby user and the nearby user's computing device, retrieve a meeting event 44 from the nearby user's computing device, and store the meeting event 44 in the electronic calendar 40.

The one or more meeting events 44 may be set-up by users via the electronic personal assistant application program 32, including a meeting time 46 for the meeting event, members to attend the meeting 52, and any suitable application data 54 to be presented during the meeting event. It will be appreciated that the electronic personal assistant application program 32 may be configured to communicate with other application programs executed on the computing device 12 to set-up the meeting events 44. For example, electronic personal assistant application program 32 may be configured to communicate with an e-mail and calendar program executed on the computing device 12 to set-up the meeting events 44.

The input module 34 is configured to receive a generic meeting invocation request 58 via a natural user input 60 detected by the input device 28. In one embodiment, the natural user input 60 is a voice input received by a microphone form of the input device 28. For example, the voice input may be a predefined voice command such as "START MY MEETING," as shown in FIG. 3. In another embodiment, the natural user input 60 is a gesture input received by a touch sensor or captured by a camera of input device 28. For example, the gesture input may be a user tracing M on the touch sensitive display of the computing device 12, or tracing an M in the air with a finger. It will be appreciated that these specific examples are merely illustrative and that other types of natural user input 60 specifically not discussed above may also be utilized for generic meeting invocation requests.

The generic meeting invocation request 58 is a request received from a user to initiate a meeting, which, for example, may include calling other meeting participants, starting an application on the computing device 12, presenting the visual meeting data 56 for the meeting event on the display 22 or a projector included in the other devices 16, etc. In one embodiment, the generic meeting invocation request 58 does not specify which meeting event of the one or more meeting events 44 is to be started. Thus, in one example, the generic meeting invocation request may not contain any identifying information for the meeting itself. In another example, the generic meeting invocation request may be a voice command that contains some additional information regarding the meeting, such as a time of the meeting (e.g. the 4:00 meeting, the noon meeting), the name of another meeting participant, a name or topic of the meeting, etc.

FIG. 3 illustrates an example generic meeting invocation request 58A received via a natural user input 60, which is a voice input 60A in this specific example. As shown, the example generic meeting invocation request 58A is a request to the computing device 12 to "START MY MEETING". It will be appreciated that the example generic meeting invocation request 58A does not specify which meeting event of the one or more meeting events 44 is to be started. In one embodiment, the computing device 12 does not identify the user 66. Thus, the computing device 12 received the example generic meeting invocation request 58A from an unidentified user 66 via the voice input 60A detected by a microphone input device of the computing device 12.

Turning back to FIG. 1, in response to receiving the generic meeting invocation request 58 at a point in time, the electronic personal assistant application program 32 is further configured to search the electronic calendar 40 for a meeting event having a meeting time 46 that is within a threshold time period of the point in time that the natural user input 60 was received, and that is scheduled to take place in the location (e.g., meeting room) in which the computing device 12 is positioned. As a specific example, the point in time may be 3:01 PM, and threshold time period may be thirty minutes. Thus, the electronic personal assistant application program may search the electronic calendar 40 for a meeting event having a meeting time 46 that is in the range of 2:31 PM to 3:31 PM, in this specific example, and that is scheduled to take place in the location in which the computing device 12 is positioned. In another example, the electronic personal assistant application program 32 is configured to search the electronic calendar 40 for a meeting event having a meeting time 46 that is within a threshold time period after the point in time that the natural user input 60 was received. Thus, if the point in time is 3:01 PM, and the threshold time period is thirty minutes, the electronic personal assistant application program 32 may search the electronic calendar 40 for a meeting event having a meeting time 46 that is in the range of 3:01 PM to 3:31 PM in this specific example. It will be appreciated that the threshold time period may be any suitable length of time, such as fifteen minutes, five minutes, an hour, etc.

In one embodiment, the meeting time 46 is a start time of the meeting event. For example, the meeting time 46 may indicate that a particular meeting event is scheduled to start at a specific time of day on a specific date, such as 3:00 PM on Tuesday as a specific example. In another embodiment, the meeting time 46 may include both a start time and a time period of the meeting event. In one specific example, the meeting time 46 may indicate that a particular meeting is scheduled from 2:00 PM to 4:00 PM on Tuesday. In this embodiment, the electronic personal assistant application program may check whether a meeting event has a scheduled time period that overlaps with the threshold time period around the point in time that the natural user input 60 was received. In the first specific example above, even though the start time for the example meeting event is at 2:00 PM, which is outside a thirty minute threshold time period prior to or after the point in time 3:01 PM (e.g., outside the one hour time period of 2:31 PM to 3:31 PM) that the natural user input was received, the period of time 2:00 PM to 4:00 PM scheduled for the example meeting event includes a portion of time that is within and overlaps the one hour time period surrounding 3:01 pm, and thus is deemed to have a meeting time 46 that is within the threshold time period. In this way, a user who arrives late to a conference room to participate in a meeting can join a meeting already in progress, or start a meeting late with other participants (e.g. users start a meeting at 3:00 even though the meeting start time was scheduled for 2:00), even when the natural user input to start the meeting is received outside the threshold period of time after the meeting start time. In this example, the user issues the natural user input command to start the meeting at 3:01 PM, which has the result of finding a matching meeting that is scheduled from 2:00 PM to 4:00 PM.

In another example, the electronic personal assistant application program 32 may be configured to not show users meeting events 44 that have already concluded. Thus, as discussed above, the electronic personal assistant application program 32 is configured to search the electronic calendar 40 for a meeting event having a meeting time 46 that has a start time that is after the point in time that the natural user input 60 was received but within a threshold time period (e.g. 30 minutes after the point in time), and/or has a time period that overlaps the point in time that the natural user input 60 was received. For example, if the electronic calendar 40 includes a first example meeting from 2:00 PM to 3:00 PM, a second example meeting from 3:00 PM to 3:20 PM, and a third example meeting from 3:30 PM to 5:30 PM, and the point in time that the natural user input 60 was received is 3:01 PM with a threshold time period of 30 minutes, then the electronic personal assistant application program 32 may be configured to show the user the second and third example meetings, but not the first example meeting because it has already concluded.

If the electronic personal assistant application program 32 does not find a meeting event that has a meeting time 46 that is within the threshold time period of the point in time that the natural user input 60 was received, then the electronic personal assistant application program 32 may be further configured to start a new meeting event.

On the other hand, if the electronic personal assistant application program 32 does find a meeting event of the one or more meeting events 44 that has a meeting time 46 that is within the threshold time period of the point in time that the natural user input 60 was received, then the electronic personal assistant application program 32 is configured to start the meeting event including processing the meeting data 48 for the meeting event, for example, electronically adding the other meeting members 52 to the meeting, calling the other meeting members 52, displaying visual meeting data 58, etc.

It will be appreciated that depending on the threshold time period, there may be multiple meeting events of the one or more meeting events 44 that have a meeting time 46 that is within the threshold time period. If more than one meeting event has a meeting time 46 that is within the threshold time period of the point in time that the natural user input 60 was received, the electronic personal assistant application program 32 is further configured to output a request 64 to prompt the user to enter a disambiguation input 62. In one embodiment, the disambiguation input 62 is an input of a meeting time 46 of the target meeting event. In another embodiment, the disambiguation input 62 is an input of a name of an organizer 50 of a target meeting event. It will be appreciated that these specific examples are merely illustrative and that other types of disambiguation input 62 specifically not discussed above may also be utilized. The disambiguation input 62 may also be received via a natural user input 60 detected by the input device 28 of computing device 12. Next, the electronic personal assistant application program 32 is further configured to receive the disambiguation input 62 from the user which indicates a target meeting event of the more than one meeting events having a meeting time 46 that is within the threshold time period, and start the target meeting event including processing the meeting data 48 for the target meeting event.

Figure 4:
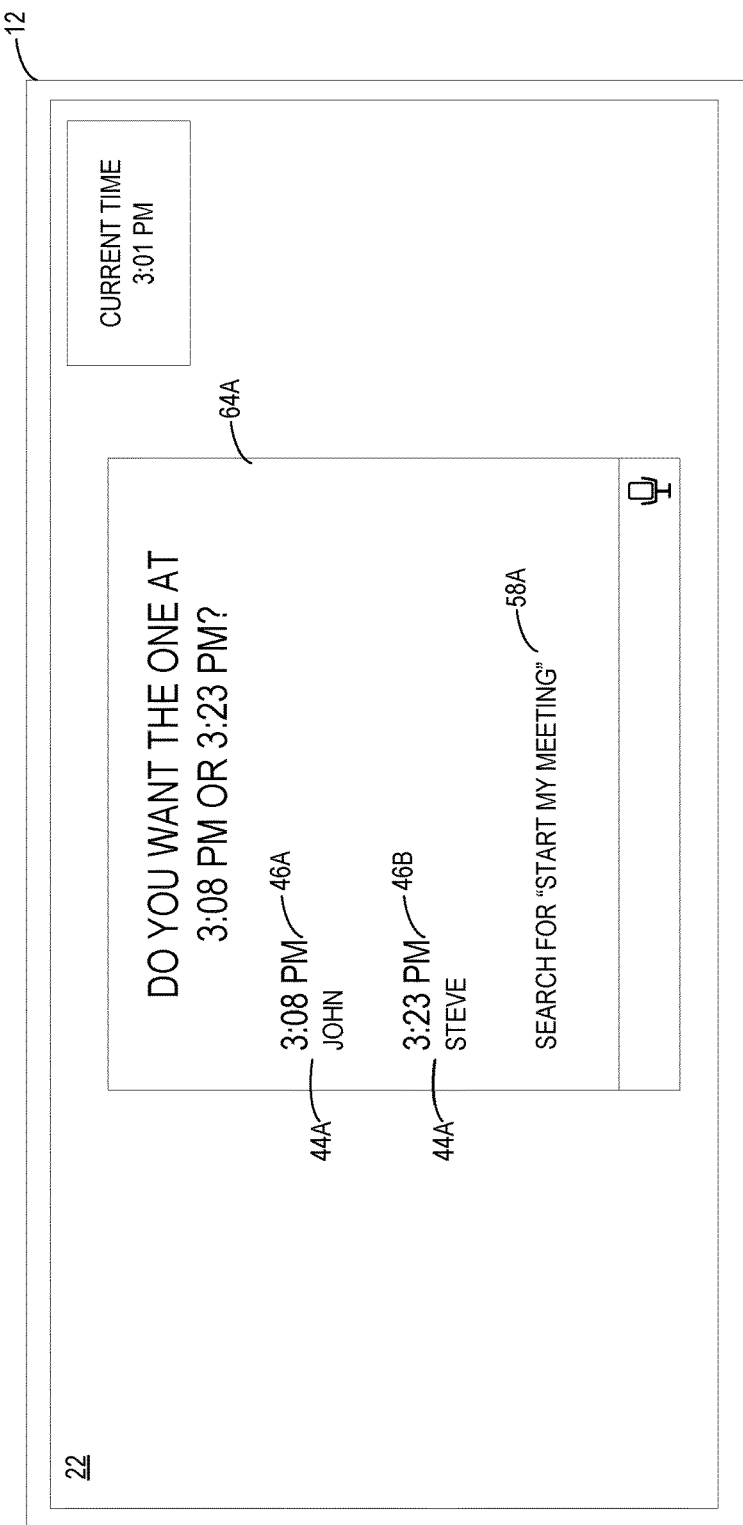
FIG. 4 shows an example graphical user interface for the computing device of FIG. 1.

FIG. 4 illustrates a graphical user interface displayed on a display 22 of a computing device 12, which is a large format display device in this example. In the illustrated example, the computing device 12 has output an example request 64A to prompt the user to enter a disambiguation input. As shown, the electronic personal assistant application program 32 found two meetings 44A and 44B having a meeting time 46A and 46B, which is a start time of the meeting events in this specific example, within a thirty minute threshold time period of a point in time that the example generic meeting invocation request 58A from FIG. 3 was received, which was 3:01 PM in this example. It will be appreciated that the request to prompt the user to enter a disambiguation input is not limited to a graphical user interface, but may also take the form of a speaker output for example, to which the user may respond using voice commands.

Figure 5:
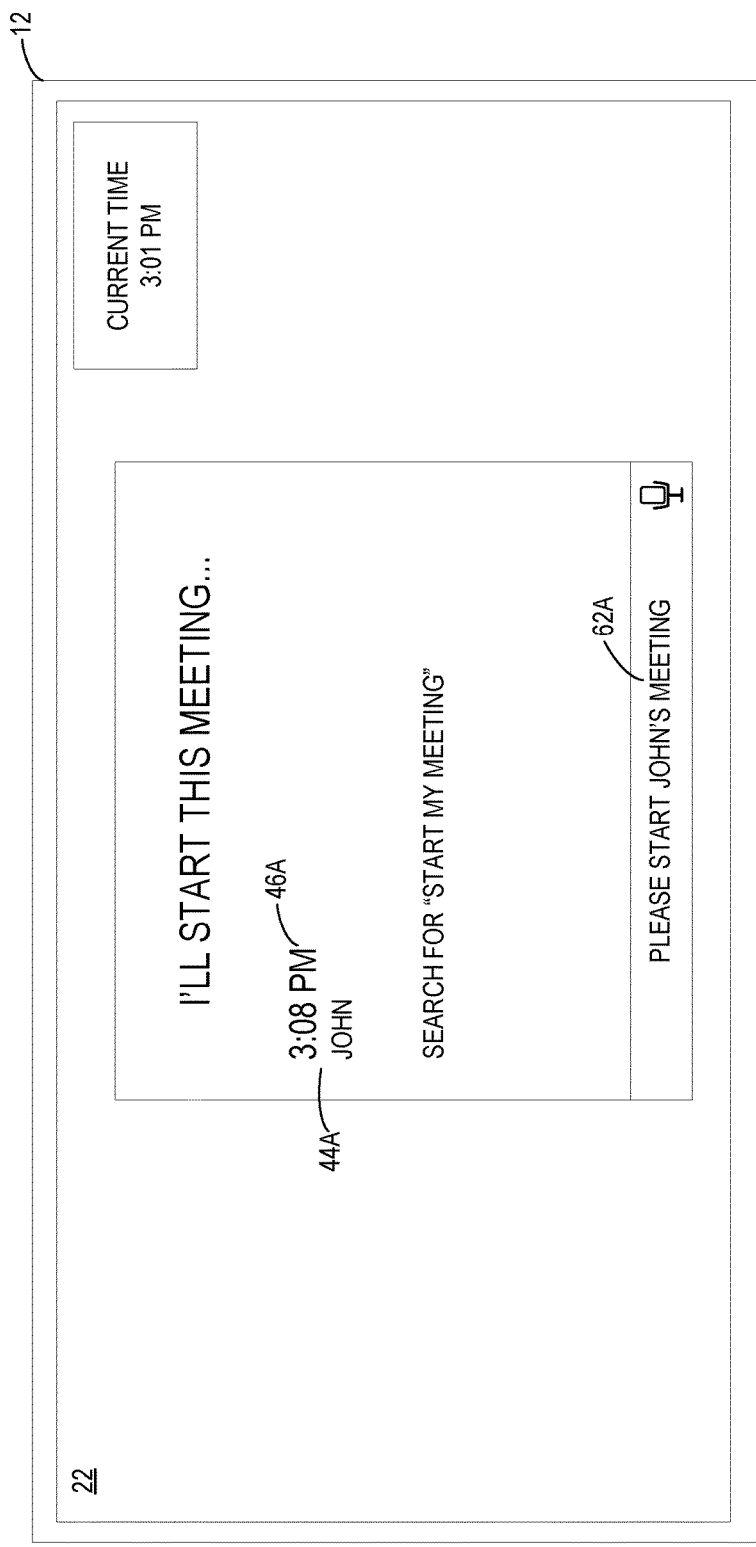
FIG. 5 shows an example graphical user interface for the computing device of FIG. 1.

Turning to FIG. 5, the electronic personal assistant application program 32 is configured to receive the disambiguation input which indicates a target meeting. In the illustrated example, the computing device 12 has detected an example disambiguation input 62A that is a voice input of "Please start John's meeting", which is a disambiguation input 62 of the name of the organizer 50 included in the meeting data 48 of the target meeting event. Thus, the electronic personal assistant application program 32 of the computing device 12 selects and starts the target meeting event specified by the disambiguation input, which is the first meeting event 44A in the illustrated example. As discussed above, it will be appreciated that the disambiguation input 62 may be an input of the target meeting's start time 46A, or any other suitable parameter to specific the target meeting.

In one embodiment of the computing device 12, the electronic personal assistant application program 32 is further configured to identify the user 66 that has entered a generic meeting invocation request 58. It will be appreciated that the user 66 may be identified using a variety of methods. For example, the computing device 12 may include a combined RGB camera and depth camera as camera 25, and may be configured to use facial recognition technology to identify the user 66. Alternatively, the computing device 12 may be configured to communicate with a personal computing device of the user 66, such as a smart phone or laptop, and identify the user 66 via credentials on the personal computing device. It will be appreciated that these specific examples are merely illustrative and that other user identification methods specifically not discussed above may also be utilized by the computing device 12.

The electronic personal assistant application program 32 may be further configured to store a calendar database including an electronic calendar 40 for each of a plurality of users. The electronic database may be stored by calendar module 36, or may be stored on the server system 14 and accessed by the calendar module 36. Thus, the electronic calendar 40 is retrieved from the calendar database. By utilizing the identification methods discussed above, the electronic personal assistant application program 32 is configured to identify a user 66 within a vicinity of the computing device 12. Upon identifying the user 66, the electronic personal assistant application program may retrieve an electronic calendar associated with the identified user from the calendar database, and proceed to start a meeting event stored in the calendar data 42 of the electronic calendar 40 associated with the identified user according to the methods discussed above. Alternatively, the electronic personal assistant application program may retrieve the electronic calendar directly from a portable computing device of the identified user within the vicinity, rather than from the calendar database. This may be accomplished by establishing a wireless link with the portable computing device via Wi-Fi or a BLUETOOTH connection, for example, and sending a calendar query to the portable computing device, and receiving a response to the query.

Once the proper meeting is identified by the computing device 12, the meeting module 38 is configured to start the meeting. Starting the meeting may involve launching a conferencing application to begin a voice conference and/or videoconference. Thus, once the meeting is commenced, audio and/or video signals are exchanged between computing device 12 and other remote devices (e.g., peer computing devices among other devices 16) participating in the meeting. In one embodiment, audio from microphone 23 and video from camera 25 is transmitted to these remote devices using voice over internet protocol (VOIP) techniques, and audio and video data from these remote devices is transmitted back, enabling meeting participants to see and hear each other during the meeting.

Figure 2:
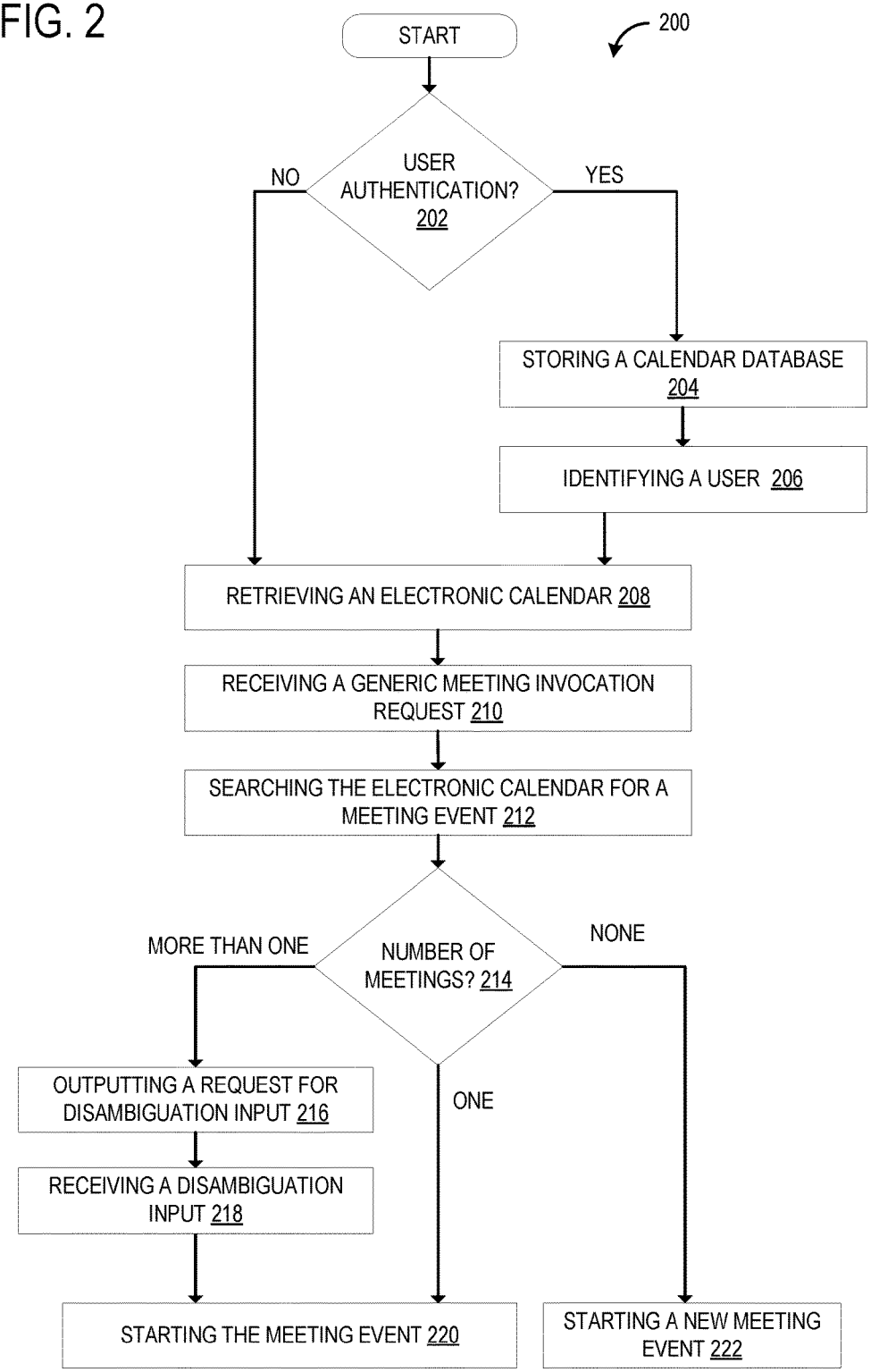
FIG. 2 shows an example method for generically initiating meetings using the computing system of FIG. 1.

FIG. 2 shows an example method 200 according to an embodiment of the present description. At step 202, the method 200 may include determining whether user authentication is active. In an embodiment where user authentication is active, the method 200 advances to step 204 and may include storing a calendar database including an electronic calendar for each of a plurality of users. Proceeding from step 204 to step 206, the method 200 may include identifying a user within a vicinity of a computing device.

Advancing from step 206 to step 208, the method 200 may include retrieving an electronic calendar including calendar data for one or more meeting events, each meeting event including a meeting time and meeting data. In the embodiment where user authentication is active, an electronic calendar associated with the identified user may be retrieved from the calendar database. Alternatively, the electronic calendar may be retrieved from a portable computing device of the identified user within the vicinity, as discussed above.

In an embodiment where user authentication is not active, the method proceeds from step 202 directly to step 208.

After retrieving the electronic calendar, the method 200 advances to step 210 and may include receiving a generic meeting invocation request via a natural user input detected by an input device. In one embodiment, the natural user input is a voice input. In another embodiment, the natural user input is a gesture input. In yet another embodiment, the generic meeting invocation request does not specify which meeting event of the one or more meeting events is to be started.

Next, in response to receiving the generic meeting invocation request at a point in time, the method 200 proceeds from step 210 to step 212 and may include searching the electronic calendar for a meeting event having a meeting time that is within a threshold time period of the point in time that the natural user input was received.

Advancing from step 212 to step 214, the method 200 may include determining whether more than one meeting event, exactly one meeting event, or no meeting event has a meeting time that is within the threshold time period of the point in time that the natural user input was received. If more than one meeting event has a meeting time that is within the threshold time period of the point in time that the natural user input was received, the method 200 proceeds from step 214 to step 216 and may include outputting a request to prompt the user to enter a disambiguation input. Next, the method 200 advances from step 216 to step 218 and may include receiving the disambiguation input from the user which indicates a target meeting event of the more than one meeting events having a meeting time that is within the threshold time period. In one embodiment, the disambiguation input is an input of a meeting time of the target meeting event. In another embodiment, the meeting data for each of the one or more meeting events includes a name of an organizer of that meeting event, and the disambiguation input is an input of a name of an organizer of the target meeting event.

Proceeding from step 218 to step 220, the method 200 may include starting the target meeting event including processing the meeting data for the target meeting event.

Turning back to step 214, if only one meeting event has a meeting time that is within the threshold time period of the point in time that the natural user input was received, the method 200 advances from step 214 directly to step 220 and may include starting the meeting event including processing the meeting data for the meeting event.

In one embodiment of method 200, if no meeting event has a meeting time that is within the threshold time period of the point in time that the natural user input was received, the method 200 advances from step 214 to step 222 and may include starting a new meeting event. The new meeting event may include a graphical user interface to allow the user to set-up the new meeting event.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
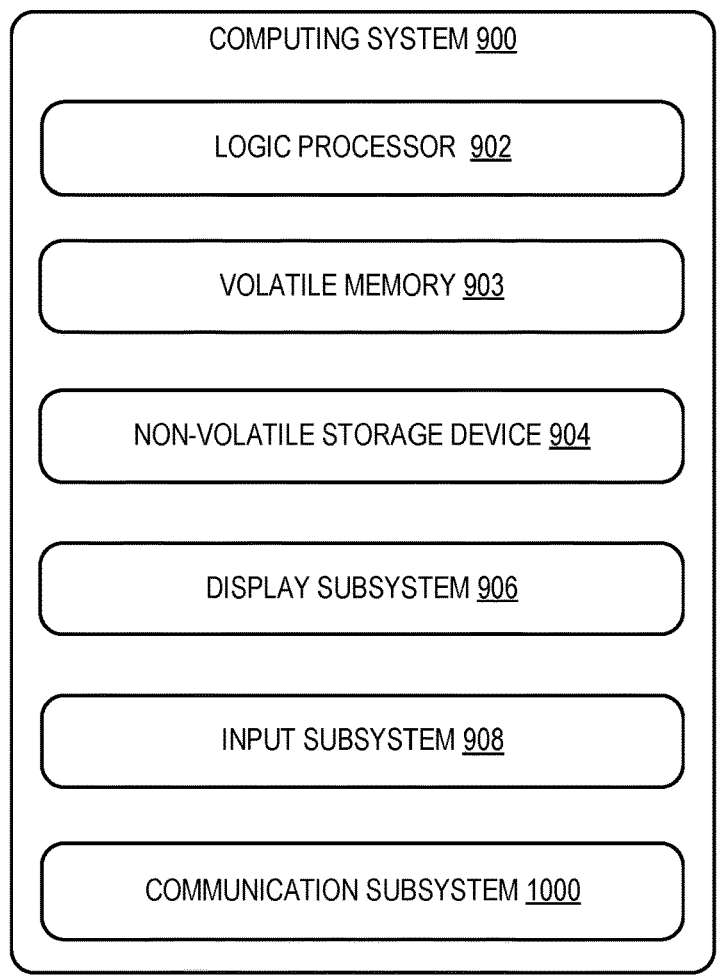
FIG. 6 shows an example computing system according to an embodiment of the present description.

FIG. 6 schematically shows a non-limiting embodiment of a computing system 900 that can enact one or more of the methods and processes described above. Computing system 900 is shown in simplified form. Computing system 900 may embody one or more of the servers of server system 14 or computing device 12, or other computing devices included in the other devices 16 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 6.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a computing device comprising: an input configured to receive natural user input, and an application program executed by a processor of the computing device, the application program configured to: retrieve an electronic calendar including calendar data for one or more meeting events, each meeting event including a meeting time and meeting data, receive a generic meeting invocation request via a natural user input detected by the input, based on at least receiving the generic meeting invocation request at a point in time, search the electronic calendar for a meeting event having a meeting time that is within a threshold time period of the point in time that the natural user input was received, and start the meeting event including processing the meeting data for the meeting event. In this aspect, the computing device may additionally or alternatively include, wherein the natural user input is a voice input. In this aspect, the computing device may additionally or alternatively include, wherein the natural user input is a gesture input. In this aspect, the computing device may additionally or alternatively include, wherein the generic meeting invocation request does not specify which meeting event of the one or more meeting events is to be started. In this aspect, the computing device may additionally or alternatively include, wherein if more than one meeting event has a meeting time that is within the threshold time period of the point in time that the natural user input was received, the application program is further configured to: output a request to prompt the user to enter a disambiguation input, receive the disambiguation input from the user which indicates a target meeting event of the more than one meeting events having a meeting time that is within the threshold time period, and start the target meeting event including processing the meeting data for the target meeting event. In this aspect, the computing device may additionally or alternatively include, wherein the disambiguation input is an input of a meeting time of the target meeting event. In this aspect, the computing device may additionally or alternatively include, wherein the meeting data for each of the one or more meeting events includes a name of an organizer of that meeting event, and wherein the disambiguation input is an input of a name of an organizer of the target meeting event. In this aspect, the computing device may additionally or alternatively include, wherein the application program is further configured to: store a calendar database including an electronic calendar for each of a plurality of users, and wherein the electronic calendar is retrieved from the calendar database. In this aspect, the computing device may additionally or alternatively include, wherein the application program is further configured to: identify a user within a vicinity of the computing device, and wherein an electronic calendar associated with the identified user is retrieved from the calendar database or from a portable computing device of the identified user within the vicinity. In this aspect, the input may include a touch sensor and a microphone, the computing device may be configured as a communal meeting device having a housing and a large format display mounted in the housing, and the touch sensor may be incorporated into the large format display and the microphone may be mounted in the housing.

Another aspect provides a method comprising: retrieving an electronic calendar including calendar data for one or more meeting events, each meeting event including a meeting time and meeting data, receiving a generic meeting invocation request via a natural user input detected by an input, based on at least receiving the generic meeting invocation request at a point in time, searching the electronic calendar for a meeting event having a meeting time that is within a threshold time period of the point in time that the natural user input was received, and starting the meeting event including processing the meeting data for the meeting event. In this aspect, the method may additionally or alternatively include, wherein the natural user input is a voice input. In this aspect, the method may additionally or alternatively include, wherein the natural user input is a gesture input. In this aspect, the method may additionally or alternatively include, wherein the generic meeting invocation request does not specify which meeting event of the one or more meeting events is to be started. In this aspect, the method may additionally or alternatively include, wherein if more than one meeting event has a meeting time that is within the threshold time period of the point in time that the natural user input was received, the method further comprises: outputting a request to prompt the user to enter a disambiguation input, receiving the disambiguation input from the user which indicates a target meeting event of the more than one meeting events having a meeting time that is within the threshold time period, and starting the target meeting event including processing the meeting data for the target meeting event. In this aspect, the method may additionally or alternatively include, wherein the disambiguation input is an input of a meeting time of the target meeting event. In this aspect, the method may additionally or alternatively include, wherein the meeting data for each of the one or more meeting events includes a name of an organizer of that meeting event, and wherein the disambiguation input is an input of a name of an organizer of the target meeting event. In this aspect, the method may additionally or alternatively include, storing a calendar database including an electronic calendar for each of a plurality of users, and wherein the electronic calendar is retrieved from the calendar database. In this aspect, the method may additionally or alternatively include, identifying a user within a vicinity of a computing device, and wherein an electronic calendar associated with the identified user is retrieved from the calendar database or from a portable computing device of the identified user within the vicinity.

Another aspect provides a communal meeting device comprising: an input configured to receive natural user input, a display, a non-volatile storage configured to store an electronic calendar including calendar data for one or more meeting events, each meeting event including a meeting time and meeting data, and a processor of the communal meeting device in communication with the non-volatile storage, the processor configured to: receive a generic meeting invocation request from an unidentified user via a natural user input detected by the input, based at least on receiving the generic meeting invocation request at a point in time: search the electronic calendar for a meeting event having a meeting time that is within a threshold time period of the point in time that the natural user input was received, and start the meeting event including processing the meeting data for the meeting event.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device comprising:
an input device configured to receive natural user input; and
an application program executed by a processor of the computing device, the application program configured to:
retrieve an electronic calendar including calendar data for one or more meeting events from an electronic database stored in a memory device, each meeting event including a meeting time and meeting data;
receive a generic meeting invocation request via a natural user input detected by the input device, wherein the generic meeting invocation request does not specify which meeting event of the one or more meeting events is to be started;
based on at least receiving the generic meeting invocation request at a point in time, search the electronic calendar for a meeting event having a meeting time that is within a threshold time period of the point in time that the natural user input was received; and
start the meeting event including processing the meeting data for the meeting event responsive to and based on receiving the generic meeting invocation request that does not specify which meeting event of the one or more meeting events is to be started, without receiving further user input;
the meeting event started by the computing device initiating a call with another computing device over a communications network and/or starting an application program at the computing device.

2. The computing device of claim 1, wherein the natural user input is a voice input.

3. The computing device of claim 1, wherein the natural user input is a gesture input.

4. The computing device of claim 1, wherein, if more than one meeting event has a meeting time that is within the threshold time period of the point in time that the natural user input was received, the application program is further configured to:
output a request to prompt the user to enter a disambiguation input;
receive the disambiguation input from the user which indicates a target meeting event of the more than one meeting events having a meeting time that is within the threshold time period; and
start the target meeting event including processing the meeting data for the target meeting event.

5. The computing device of claim 4, wherein the disambiguation input is an input of a meeting time of the target meeting event.

6. The computing device of claim 4, wherein the meeting data for each of the one or more meeting events includes a name of an organizer of that meeting event; and
wherein the disambiguation input is an input of a name of an organizer of the target meeting event.

7. The computing device of claim 1, wherein the application program is further configured to:
store a calendar database including an electronic calendar for each of a plurality of users; and
wherein the electronic calendar is retrieved from the calendar database.

8. The computing device of claim 7, wherein the application program is further configured to:

identify a user within a vicinity of the computing device; and
wherein an electronic calendar associated with the identified user is retrieved from the calendar database or from a portable computing device of the identified user within the vicinity.

9. The computing device of claim 1,
wherein the input device includes a touch sensor and a microphone; and
wherein the computing device is configured as a communal meeting device having a housing and a large format display mounted in the housing; and
wherein the touch sensor is incorporated into the large format display and the microphone is mounted in the housing.

10. A method performed by a computing system, the method comprising;
retrieving an electronic calendar including calendar data for one or more meeting events from an electronic database stored in a memory device, each meeting event including a meeting time and meeting data;
receiving a generic meeting invocation request via a natural user input detected by an input device, wherein the generic meeting invocation request does not specify which meeting event of the one or more meeting events is to be started;
based on at least receiving the generic meeting invocation request at a point in time, searching the electronic calendar for a meeting event having a meeting time that is within a threshold time period of the point in time that the natural user input was received; and
starting the meeting event including processing the meeting data for the meeting event responsive to and based on receiving the generic meeting invocation request that does not specify which meeting event of the one or more meeting events is to be started, without receiving further user input;
the meeting event started by initiating a call with another computing device over a communications network and/or starting an application program at the computing system.

11. The method of claim 10, wherein the natural user input is a voice input.

12. The method of claim 10, wherein the natural user input is a gesture input.

13. The method of claim 10, further comprising:
if more than one meeting event has a meeting time that is within the threshold time period of the point in time that the natural user input was received, then:
outputting a request to prompt the user to enter a disambiguation input;
receiving the disambiguation input from the user which indicates a target meeting event of the more than one meeting events having a meeting time that is within the threshold time period; and
starting the target meeting event including processing the meeting data for the target meeting event.

14. The method of claim 13, wherein the disambiguation input is an input of a meeting time of the target meeting event.

15. The method of claim 13, wherein the meeting data for each of the one or more meeting events includes a name of an organizer of that meeting event; and
wherein the disambiguation input is an input of a name of an organizer of the target meeting event.

16. The method of claim 10, further comprising:
storing a calendar database including an electronic calendar for each of a plurality of users; and
wherein the electronic calendar is retrieved from the calendar database.

17. The method of claim 16, further comprising:
identifying a user within a vicinity of a computing device; and
wherein an electronic calendar associated with the identified user is retrieved from the calendar database or from a portable computing device of the identified user within the vicinity.

18. A communal meeting device, comprising:
an input device configured to receive natural user input;
a display;
a non-volatile storage device configured to store an electronic calendar including calendar data for one or more meeting events, each meeting event including a meeting time and meeting data; and
a processor in communication with the non-volatile storage, the processor configured to:
receive a generic meeting invocation request from an unidentified user via a natural user input detected by the input device, wherein the generic meeting invocation request does not specify which meeting event of the one or more meeting events is to be started;
based on at least receiving the generic meeting invocation request at a point in time, search the electronic calendar stored within the non-volatile storage device for a meeting event having a meeting time that is within a threshold time period of the point in time that the natural user input was received; and
start the meeting event including processing the meeting data for the meeting event responsive to and based on receiving the generic meeting invocation request that does not specify which meeting event of the one or more meeting events is to be started, without receiving further user input;
the meeting event started by the communal meeting device initiating a call with another computing device over a communications network and/or starting an application program at the communal meeting device.

* * * * *